United States Patent
Kagaya et al.

(10) Patent No.: US 9,823,829 B2
(45) Date of Patent: Nov. 21, 2017

(54) IMAGE DISPLAY APPARATUS AND METHOD FOR CONTROLLING THE SAME

(71) Applicant: CANON KABUSHIKI KAISHA, Tokyo (JP)

(72) Inventors: Sosuke Kagaya, Ebina (JP); Atsushi Morita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/096,697

(22) Filed: Apr. 12, 2016

(65) Prior Publication Data

US 2016/0307541 A1 Oct. 20, 2016

(30) Foreign Application Priority Data

Apr. 14, 2015 (JP) ................................. 2015-082349
Mar. 14, 2016 (JP) ................................. 2016-049323

(51) Int. Cl.
*G09G 5/02* (2006.01)
*G06F 3/0484* (2013.01)
*G09G 5/00* (2006.01)
*G09G 5/10* (2006.01)

(52) U.S. Cl.
CPC ...... *G06F 3/04847* (2013.01); *G06F 3/04842* (2013.01); *G09G 5/00* (2013.01); *G09G 5/003* (2013.01); *G09G 5/02* (2013.01); *G09G 5/10* (2013.01); *G09G 2320/0626* (2013.01); *G09G 2320/0666* (2013.01); *G09G 2320/08* (2013.01); *G09G 2340/12* (2013.01); *G09G 2354/00* (2013.01); *G09G 2360/145* (2013.01); *G09G 2360/16* (2013.01)

(58) Field of Classification Search
CPC ................................. G09G 5/02; G09G 5/06
See application file for complete search history.

(56) References Cited

U.S. PATENT DOCUMENTS

| | | | | |
|---|---|---|---|---|
| 2003/0178550 A1* | 9/2003 | Yamamoto | ........... | H04N 1/6094 |
| | | | | 250/208.1 |
| 2011/0074945 A1* | 3/2011 | Watanabe | ............. | H04N 5/232 |
| | | | | 348/81 |
| 2012/0293331 A1* | 11/2012 | Wu | ..................... | G06F 11/3438 |
| | | | | 340/573.1 |
| 2014/0362128 A1* | 12/2014 | Huang | ................. | G09G 3/3208 |
| | | | | 345/690 |
| 2015/0348468 A1* | 12/2015 | Chen | .................... | G09G 3/3406 |
| | | | | 345/207 |
| 2016/0027282 A1* | 1/2016 | Lee | ...................... | A61B 5/0075 |
| | | | | 340/573.1 |
| 2016/0063951 A1* | 3/2016 | Ikizyan | ................... | G09G 5/02 |
| | | | | 345/590 |

FOREIGN PATENT DOCUMENTS

JP 2002-366129 A 12/2002

* cited by examiner

*Primary Examiner* — Phi Hoang
(74) *Attorney, Agent, or Firm* — Cowan, Liebowitz & Latman, P.C.

(57) ABSTRACT

An image display apparatus according to the present invention includes: a display unit configured to display an image on a screen; a calculation unit configured to calculate, based on input image data, an amount of light of a predetermined color emitted from the screen in a case where an image based on the input image data is displayed on the screen; and a notification unit configured to perform predetermined notification, based on the amount of light calculated by the calculation unit.

17 Claims, 14 Drawing Sheets

(12) United States Patent
US 9,823,829 B2

IMAGE DISPLAY APPARATUS AND METHOD FOR CONTROLLING THE SAME

BACKGROUND OF THE INVENTION

Field of the Invention

The present invention relates to an image display apparatus and a method for controlling the image display apparatus.

Description of the Related Art

Liquid-crystal display apparatuses include a liquid-crystal panel, a backlight arranged on a rear side of the liquid-crystal panel, and a control circuit that controls operations of the liquid-crystal panel and the backlight. In recent years, for reproduction of a wide color gamut, power saving, and the like, liquid-crystal display apparatuses have become widespread which have a white LED (a LED (light-emitting diode) that emits white light), three-primary-color LEDs, or the like as backlight light-emitting elements. The three-primary-color LEDs include a red LED, a green LED, and a blue LED.

Continuously viewing light with a short wavelength in a visible wavelength region (for example, blue light) for a long time is considered to lead to health hazards in the eyes. The health hazards caused by blue light include eye strain, a headache, a change in a biological rhythm. For example, the blue light has a wavelength which is not less than 380 nm and not more than 495 nm. In the JIS standards, such a function as illustrated in FIG. 1 is defined as a hazard function that represents a corresponding relation between the wavelength of light and the degree of the adverse effect of light on human bodies. The hazard function illustrated in FIG. 1 is referred to as a "blue-light hazard function" because the hazard function indicates a high degree (the degree of the adverse effect) for the wavelength of blue light. Spectral characteristics of white and blue LEDs used for the liquid-crystal display apparatuses and the like exhibit a peak wavelength of approximately 450 nm (the wavelength with the highest spectral radiance). That is, the peak wavelength in the spectral characteristics of white and blue LEDs is close to the peak wavelength in the hazard function (the wavelength with the highest degree of adverse effect of light on human bodies). Thus, light emitted from white or blue LEDs is considered to notably seriously affect the human bodies.

Japanese Patent Application Laid-open No. 2002-366129 discloses a technique for issuing a warning in a case where a cumulative time for VDT (visual display terminals such as personal computers) operations reaches a threshold. However, the technique disclosed in Japanese Patent Application Laid-open No. 2002-366129 takes into account only the cumulative time for the VDT operations and not colors contained in a display target image. Thus, in a case where a user of an image display apparatus continuously views displayed images (images displayed on a screen) containing much blue color for a long time, the warning may fail to be issued because the cumulative time for VDT operations has not reached the threshold. As a result, health hazards caused by light of a predetermined color such as blue light fail to be effectively prevented.

SUMMARY OF THE INVENTION

The present invention provides a technique for allowing effective prevention of health hazards caused by light of a predetermined color.

The present invention in its first aspect provides an image display apparatus comprising:
a display unit configured to display an image on a screen;
a calculation unit configured to calculate, based on input image data, an amount of light of a predetermined color emitted from the screen in a case where an image based on the input image data is displayed on the screen; and
a notification unit configured to perform predetermined notification, based on the amount of light calculated by the calculation unit.

The present invention in its second aspect provides a method for controlling an image display apparatus, comprising:
displaying an image on a screen;
calculating, based on input image data, an amount of light of a predetermined color emitted from the screen in a case where an image based on the input image data is displayed on the screen; and
performing predetermined notification, based on the calculated amount of light.

The present invention in its third aspect provides a non-transitory computer readable medium that stores a program, wherein the program causes a computer to execute
displaying an image on a screen;
calculating, based on input image data, an amount of light of a predetermined color emitted from the screen in a case where an image based on the input image data is displayed on the screen; and
performing predetermined notification, based on the calculated amount of light.

An aspect of the present invention allows effective prevention of health hazards caused by light of a predetermined color.

Further features of the present invention will become apparent from the following description of exemplary embodiments with reference to the attached drawings.

DESCRIPTION OF THE EMBODIMENTS

Embodiment 1

An image display apparatus and a method for controlling the image display apparatus according to Embodiment 1 of the present invention will be described. The present invention is applicable to any image display-apparatuses. For example, the present invention is applicable to a liquid-crystal display apparatus, an organic EL display apparatus, a plasma display apparatus, a projector, and the like. In the present embodiment, an example will be described where pixel values for image data are RGB values (a combination of an R value, a G value, and a B value). However, the pixel values are not limited to the RGB values. For example, the pixel values may be YCbCr values (a combination of a Y value, a Cb value, and a Cr value).

Figure 2:
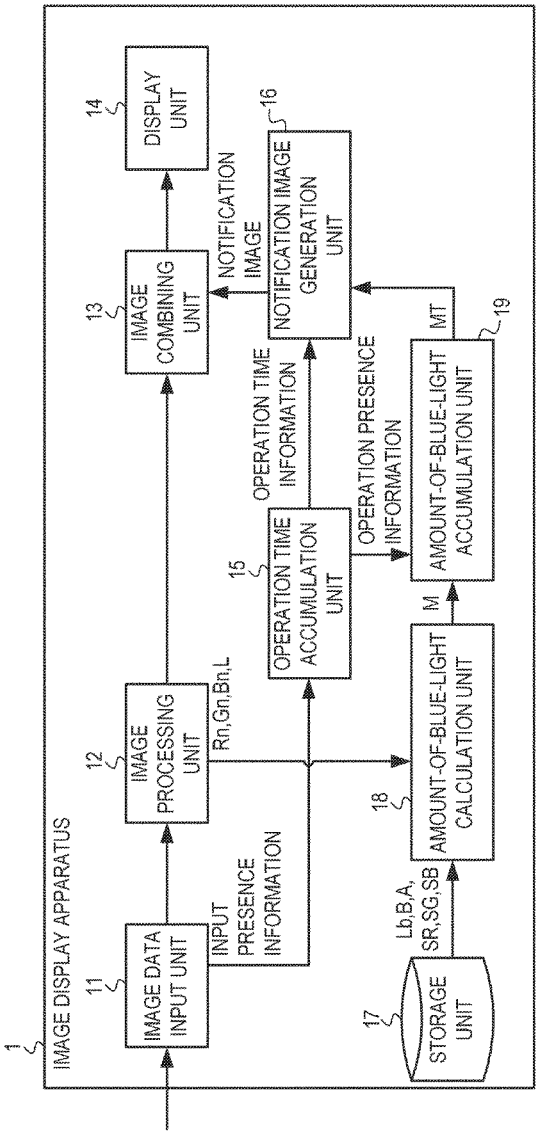
FIG. 2 is a block diagram depicting an example of a configuration of an image display apparatus according to Embodiment 1.

FIG. 2 is a block diagram depicting an example of a configuration of an image display apparatus 1 according to the present embodiment.

An image data input unit 11 acquires image data input to the image display apparatus 1 (input image data), and outputs the acquired input image data to an image processing unit 12. The image data input unit 11 also detects input of the input image data to the image display apparatus 1 and outputs, to an operation time accumulation unit 15, input presence information indicating whether or not input image data has been input to the image display apparatus 1. The input image data is input to the image display apparatus 1, for example, via a personal computer, a digital camera, any of various recorders (a hard disk recorder, a Blu-ray recorder, and the like), any of various players, or a game machine. The image data input unit 11 may acquire the input image data by reading the input image data from a recording medium. As the recording medium, a magnetic disk, an optical disc, a semiconductor memory, or the like may be used.

The image processing unit 12 performs predetermined image processing on the input image data output from the image data input unit 11 to generate processed image data. The predetermined image processing is, for example, image processing in which pixel values for the input image data are converted in accordance with set color temperatures, color gamut, brightness, gamma, or the like. As the predetermined image processing, edge enhancement, blurring, or the like may be performed. In the predetermined image processing, for example, the pixel values for the input image data are converted using, for example, a function representing a corresponding relation between the pixel values for the input image data and pixel values for the processed image data or a Lookup Table (LUT). The image processing unit 12 then outputs the resultant processed image data to an image combining unit 13.

The image processing unit 12 also uses the resultant processed image data to calculate an average value Rn of R values for the processed image data, an average value Gn of G values for the processed image data, and an average value Bn of B values for the processed image data. The image processing unit 12 then outputs a brightness gain value L and the calculated average values Rn, Gn, and Bn to an amount-of-blue-light calculation unit 16.

As a representative value for the R values for the pixels in the processed image data, a value other than the average value Rn may also be calculated. For example, instead of the average value Rn, a maximum value, a minimum value, a mode, an intermediate value, and the like of the R values for the processed image data may be calculated. This also applies to the G values and the B values.

In a case where notification image data is output from a notification image generation unit 16, the image combining unit 13 combines the notification image data and the processed image data output from the image processing unit 12 to generate combined image data. The image combining unit 13 then outputs the resultant combined image data to a display unit 14. The combined image data represents an image in which a notification image is superimposed on a processed image. The processed image is an image represented by the processed image data. The notification image is an image represented by the notification image data. The notification image (data) will be described below in detail. In a case where no notification image data is output from the notification image generation unit 16, the image combining unit 13 outputs the processed image data to the display unit 14.

The display unit 14 displays, on a screen, an image corresponding to image data input to the display unit 14. In the present embodiment, the image corresponding to the processed image data or the combined image data is displayed. The display unit 14 also changes at least one of the color and brightness of the screen (the image displayed on the screen) using a set parameter. In the present embodiment, an example will be described where the brightness gain value is used as the above-described parameter. The brightness gain value L is a parameter, in accordance with which the brightness of the screen is changed. For example, a doubled brightness gain value doubles the brightness of the screen, and a quadrupled brightness gain value quadruples the brightness of the screen. The above-described brightness gain value L is the current set value of the brightness gain value.

A method for setting the above-described parameter is not particularly limited. For example, the parameter may be set in accordance with a user's operation or automatically set according to a usage environment of the image display apparatus 1.

The operation time accumulation unit 15 measures a time for which user operations have been performed (operation time). The user operations are VDT operations performed by the user using the image display apparatus 1. In the present embodiment, the operation time accumulation unit 15 determines the operation time by measuring a display time for a display target image that is an image based on the input image data. In the present embodiment, the display target image is an image corresponding to the processed image data.

Specifically, the operation time accumulation unit 15 determines whether or not the input image data has been input based on input presence information output from the image data input unit 11. The operation time accumulation unit 15 considers a timing when the input of the input image data is started (resumed) to be a timing when the user operation is started (resumed). The operation time accumulation unit 15 considers a timing when the input of the input image data is ended (suspended) to be a timing when the user operation is ended (suspended). The operation time accumulation unit 15 starts a first increase process for gradually increasing the value of the operation time, at the timing when the input of the input image data is started. In a case where the operation time reaches a first threshold/the operation time accumulation unit 15 outputs information on the operation time (operation time information) to the notification image generation unit 16. Then, at the timing when the input of the input image data is ended, the operation time accumulation unit 15 suspends the first increase process and starts a first reduction process for gradually reducing the value of the operation time. The operation time accumulation unit 15 ends the first reduction process at the timing when the value of the operation time is 0 (zero). In a case where the input of the input image data is started during execution of the first reduction process, the operation time accumulation unit 15 suspends the first reduction process at the timing when the input of the input image data is started.

The operation time accumulation unit 15 also outputs, to the amount-of-blue-light accumulation unit 19, operation presence information indicating whether or not the user operation is being performed. The operation presence information may be the same as or different from the input presence information.

The unit of the operation time is not particularly limited. The operation time may be in units of seconds or minutes. Furthermore, the frequency of increases or reductions in the value of the operation time is not particularly limited. For example, the operation time may be updated at intervals of 1 second, 10 seconds, or 30 seconds. Alternatively, the operation time may be updated at intervals of 1 minute or 5 minutes. In addition, the amount of reduction achieved by the first reduction process per unit time is not particularly limited. For example, the amount of reduction per unit time may be a value resulting from division of the first threshold by a time (time for rest) needed to recover from a health hazard caused by the above-described operation.

The first reduction process is not limited to the above-described process. For example, in a case where the display target image is not displayed from the end of a display period for the display target image until a threshold time elapses, the value of the operation time may be reset to zero. Specifically, at the timing when the input of the input image data is ended, the operation time accumulation unit 15 may suspend the first increase process and start measuring a time for which the user operation is not performed (non-operation time). The operation time accumulation unit 15 may then reset the operation time to 0 at the timing when the non-operation time reaches a second threshold (the above-described threshold time).

The above-described first threshold and second threshold may be values that are pre-specified by a relevant manufacturer or that are changeable by the user or that are automatically set according to the usage environment of the image display apparatus 1.

Figure 1:
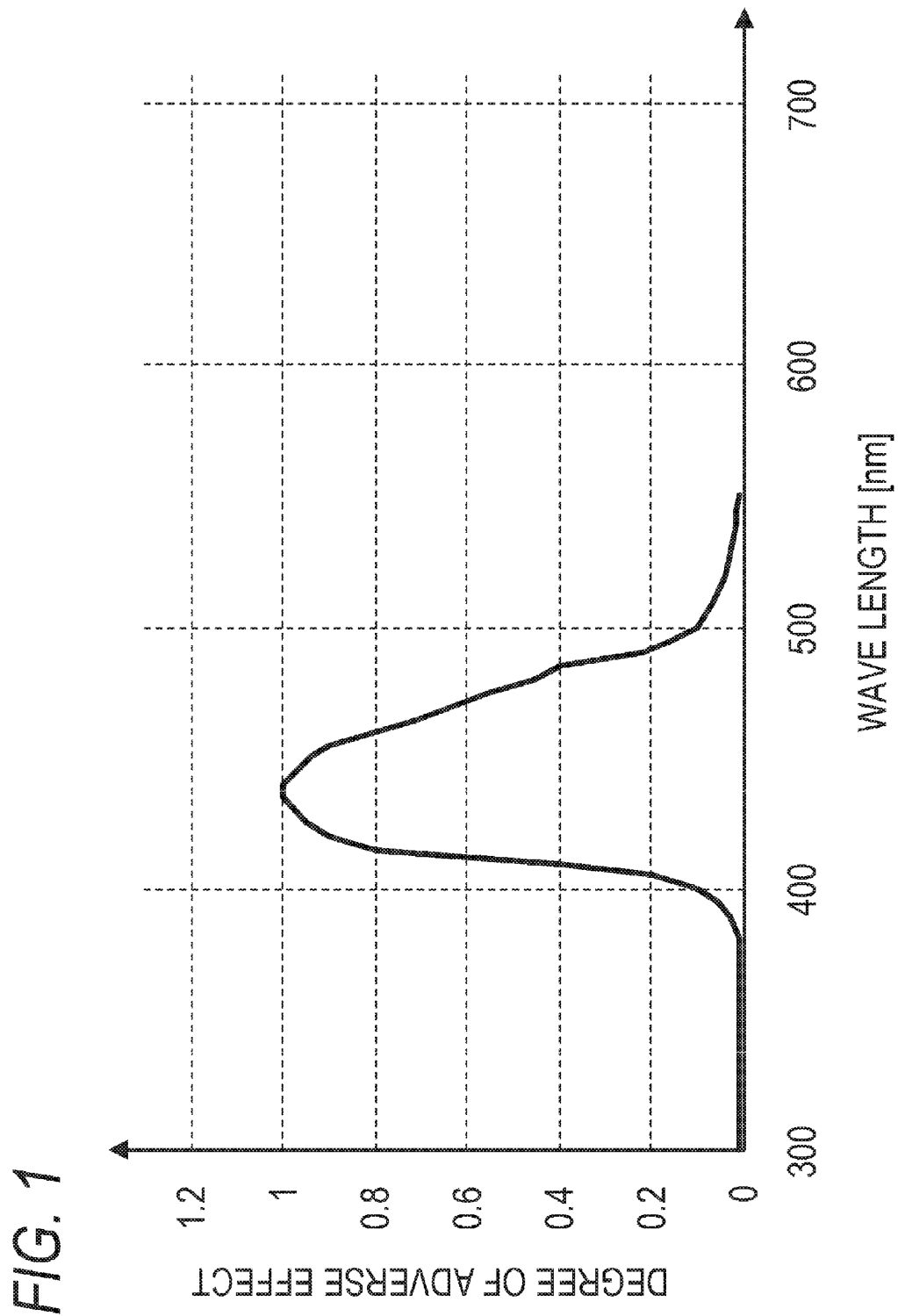
FIG. 1 is a diagram illustrating an example of a blue light hazard function according to Embodiment 1.

The storage unit 17 stores a reference brightness gain value Lb, a blue-light hazard function $B(\lambda)$, and a display unit size A [$m^2$]. The storage unit 17 also stores a plurality of spectral data corresponding to a plurality of colors including a predetermined color. In the present embodiment, the predetermined color is blue. In the present embodiment, the storage unit 17 then stores reference spectral data $SR(\lambda)$, $SG(\lambda)$, $SB(\lambda)$, and $SK(\lambda)$ as the plurality of spectral data. The reference brightness gain value Lb is a reference value for the brightness gain value. The reference brightness gain value Lb may be any value. The blue-light hazard function $B(\lambda)$ represents a corresponding relation between the wavelength of light and the degree of the adverse effect of light on the human body (FIG. 1). The display unit size A is the size of the screen. The reference spectral data $SR(\lambda)$ is spectral data corresponding to red. The reference spectral data $SG(\lambda)$ is spectral data corresponding to green. The reference spectral data $SB(\lambda)$ is spectral data corresponding to blue. The reference spectral data $SK(\lambda)$ is spectral data corresponding to black. The spectral data represents a corresponding relation between a wavelength $\lambda$ and spectral radiance [$W \cdot m^{-2} \cdot sr^{-1} \cdot nm^{-1}$].

Each of the plurality of spectral data represents a spectral characteristic of light emitted from the screen in a case where the image data on the color corresponding to the spectral data is displayed on the screen. In the present embodiment, each of the plurality of spectral data represents the spectral characteristic of light emitted from the screen in a case where the image data on the color corresponding to the spectral data is displayed on the screen using the reference brightness gain value Lb.

Gradation values (R value, G value, and B value) for image data are assumed to be 3-bit values (0 to 255). Then, the reference spectral data $SR(\lambda)$ represents a spectral characteristic of light emitted from the screen in a case where image data with a pixel value (R value, G value, B value)= (255, 0, 0) is displayed on the screen using the reference brightness gain value Lb. The reference spectral data $SG(\lambda)$ represents a spectral characteristic of light emitted from the screen in a case where image data with a pixel value (0, 255, 0) is displayed on the screen using the reference brightness gain value Lb. The reference spectral data $SB(\lambda)$ represents a spectral characteristic of light emitted from the screen in a case where image data with a pixel value (0, 0, 255) is displayed on the screen using the reference brightness gain value Lb. The reference spectral data $SK(\lambda)$ represents a spectral characteristic of light emitted from the screen in a case where image data with a pixel value (0, 0, 0) is displayed on the screen using the reference brightness gain value Lb.

With age-related degradation of the display unit 14 taken into account, various data stored in the storage unit 17 may be updated. For example, in a case where the display unit 14 has a light-emitting unit and a display panel that displays images on the screen by modulating light emitted from the light-emitting unit, various data stored in the storage unit 17 may be updated with age-related degradation of the light-emitting unit and a liquid-crystal panel taken into account. The use of spectral data may be omitted for at least any of the red, blue, green, and black. Spectral data may be used which corresponds to a color other than the red, blue, green, and black.

The amount-of-blue-light calculation unit 18 calculates the amount M [$W \cdot sr^{-1}$] of blue light (light of a predetermined color) emitted from the screen in a case where the display target image is displayed on the screen, based on the input image data (processed image data). The amount of light M is hereinafter referred to as the "amount of blue light M". In the present embodiment, the amount-of-blue-light calculation unit 18 calculates the amount of blue light M based on processed image data (average values Rn, Gn, and Bn), the brightness gain value L, the reference brightness gain value Lb, the blue-light hazard function $B(\lambda)$, the display unit size A, and the reference spectral data $SR(\lambda)$, $SG(\lambda)$, $SB(\lambda)$, and $SK(\lambda)$. The amount-of-blue-light calculation unit 18 then outputs the calculated amount of blue light M to the amount-of-blue-light accumulation unit 19. A method for calculating the amount of blue light M will be described below in detail. The blue light is light with a wavelength which is not less than 380 nm and not more than 495 nm. A wavelength region for blue light is not limited to a wavelength region from 380 nm to 495 nm. For example, the wavelength region for blue light may be larger or smaller than the wavelength region from 380 nm to 495 nm.

The amount-of-blue-light accumulation unit 19 calculates the current total amount of blue light MT emitted from the screen by accumulating the amount of blue light M calculated by the amount-of-blue-light calculation unit 18 during a display period for the display target image. In the present embodiment, the display period for the display target image is treated as a period when the user operation is performed. Thus, the expression "an amount of blue light M is accumulated during the display period for the display target image" may be replaced with the expression "an amount of blue light M is accumulated during the period when the user operation is performed".

Specifically, the amount-of-blue-light accumulation unit 19 determines whether or not the user operation is being performed based on the operation presence information output from the operation time accumulation unit 15. The amount-of-blue-light accumulation unit 19 starts a second increase process for gradually increasing the value of the total amount of light MT at the timing when the user operation is started (resumed). In a case where the total amount of light MT reaches a third threshold (first threshold amount of light), the amount-of-blue-light accumulation unit 19 outputs information on the total amount of light MT (total-amount-of-light information) to the notification image generation unit 16. Then, at the timing when the user operation is ended (suspended), the amount-of-blue-light accumulation unit 19 suspends the second increase process and starts a second reduction process for gradually reducing the value of the total amount of light MT. The amount-of-blue-light accumulation unit 19 ends the second reduction process at the timing when the value of the total amount of light MT is 0. In a case where the user operation is started during execution of the second reduction process, the amount-of-blue-light accumulation unit 19 suspends the second reduction process at the timing when the user operation is started. Thus, in the present embodiment, the total amount of light MT is gradually reduced during a non-display period for the display target image.

The frequency of increases and reductions in the value of the total amount of light MT is no particularly limited. For example, the total amount of light MT may be updated at intervals of 1 second, 10 seconds, or 30 seconds. Alternatively, the total amount of light MT may be updated at intervals of 1 minute or 5 minutes. Furthermore, the amount of reduction achieved by the second reduction process per unit time is not particularly limited. For example, the amount of reduction per unit time may be a value resulting from division of the third threshold by the time (time for rest) needed to recover from a health hazard caused by blue light.

The second reduction process is not limited to the above-described process. For example, in a case where the display target image is not displayed from the end of the display period for the display target image until the threshold time elapses, the value of the total amount of light MT may be reset to zero. Specifically, at the timing when the user operation is ended, the amount-of-blue-light accumulation unit 19 may suspend the second increase process and start measuring the non-operation time. Then, at the timing when the non-operation time reaches a fourth threshold (the above-described threshold time), the amount-of-blue-light accumulation unit 19 may reset the value of the total amount of light MT to 0.

The above-described third threshold and fourth threshold may be values that are pre-specified by the relevant manufacturer or that are changeable by the user or that are automatically set according to the usage environment of the image display apparatus 1.

The notification image generation unit 16 executes a process for predetermined notification in a case where the operation time information is output from the operation time accumulation unit 15 and in a case where total-amount-of-light information is output from the amount-of-blue-light accumulation unit 19. In the present embodiment, the notification image generation unit 16 generates notification image data and outputs the resultant notification image data to the image combining unit 13 in a case where the operation time accumulation unit 15 outputs the operation time information and in a case where the amount-of-blue-light accumulation unit 19 outputs the total-amount-of-light information. A notification image represented by the notification image data is an image that prompts suspension of the user operation. Specifically, in a case where the operation time information is output from the operation time accumulation unit 15, the notification image generation unit 16 acquires information indicative of the current total amount of light MT from the amount-of-blue-light accumulation unit 19. In a case where the total-amount-of-light information is output from the amount-of-blue-light accumulation unit 19, the notification image generation unit 16 acquires information indicative of the current operation time from the operation time accumulation unit 15. Then, based on the acquired information, the notification image generation unit 16 generates and outputs notification image data representing the current operation time, the current total amount of light MT, and a message that prompts suspension of the user operation. Subsequently, the image combining unit 13 and the display unit 14 execute appropriate processes to notify the user of the current operation time, the current total amount of light MT, and the message that prompts suspension of the user operation.

The information provided to the user and a method for the notification are not particularly limited as long as suspension of the user operation can be prompted. For example, predetermined information (a message, a graphic image (a mark or a symbol) or the like) at least indicating that the operation time has reached the first threshold may be displayed on the screen in a case where the operation time information is output from the operation time accumulation unit 15. Alternatively, predetermined information at least indicating that the total amount of light MT has reached the third threshold may be displayed on the screen in a case where the total-amount-of-light information is output from the amount-of-blue-light accumulation unit 19. The notification may be performed using sound or light (for example, light emitted from a lamp other than the screen) instead of image display.

Now, a method for calculating the amount of blue light M [$W \cdot sr^{-1}$] according to the present embodiment will be described.

First, the amount-of-blue-light calculation unit 18 calculates spectral data $S(\lambda)$ [$W \cdot m^{-2} \cdot sr^{-1} \cdot nm^{-1}$] using Expression 1 illustrated below. The spectral data S(M represents a spectral characteristic of light emitted from the screen in a case where the display target image is displayed on the screen.

[Math. 1]

$$S(\lambda) = \frac{L}{Lb} \cdot \left( \frac{Rn}{255} \cdot (SR(\lambda) - SK(\lambda)) + \frac{Gn}{255} \cdot (SG(\lambda) - SK(\lambda)) + \frac{Bn}{255} \cdot (SB(\lambda) - SK(\lambda)) + SK(\lambda) \right)$$

(Expression 1)

Then, the amount-of-blue-light calculation unit 18 calculates the amount of blue light M [W·sr$^{-1}$] using Expression 2 illustrated below. In Expression 2, a wavelength width is denoted by Δλ.

[Math. 2]

$$M = A \cdot \sum_{\lambda=300}^{700} S(\lambda) \cdot B(\lambda) \cdot \Delta\lambda$$

(Expression 2)

Figure 3:
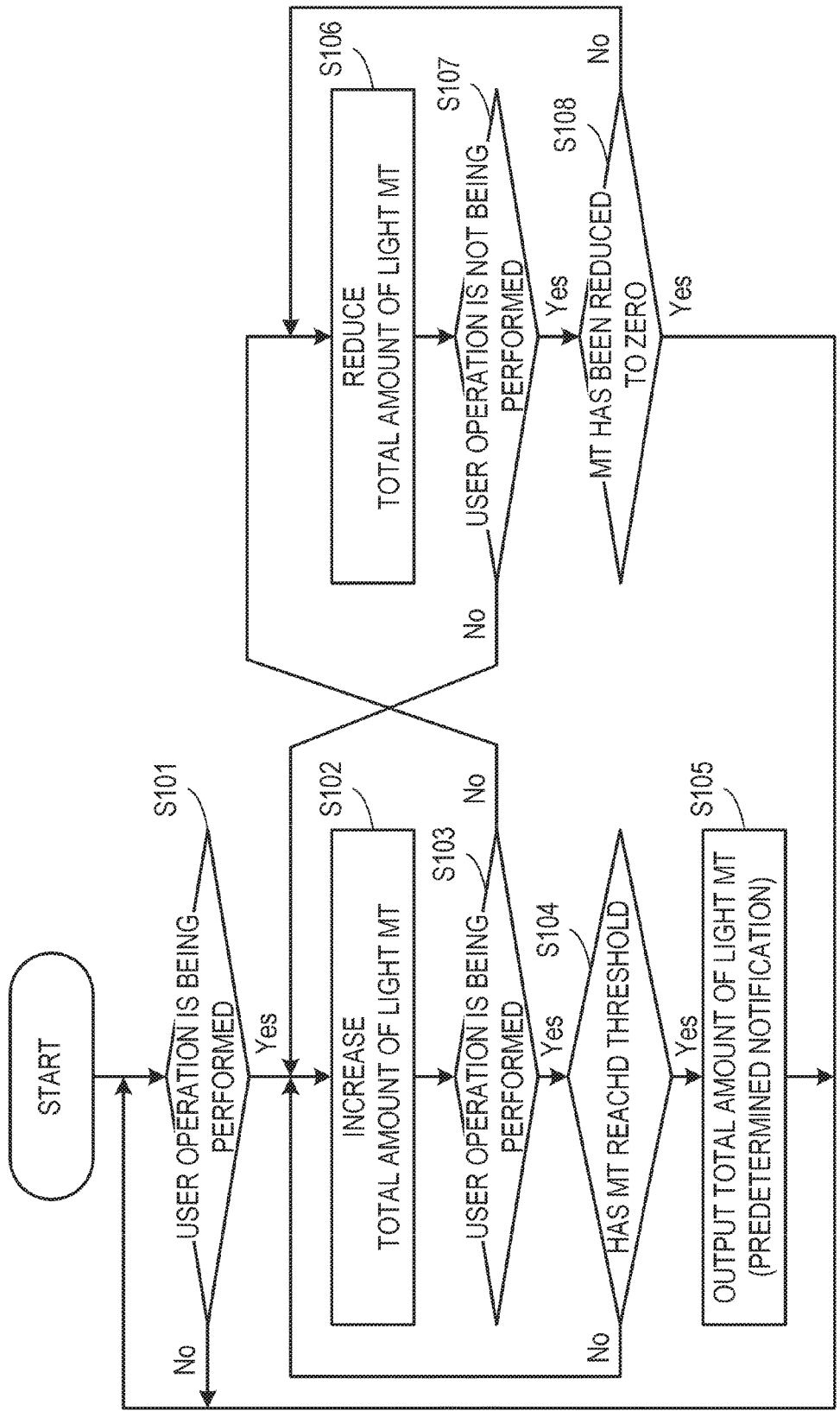
FIG. 3 is a flowchart illustrating an example of a process flow of an amount-of-blue-light accumulation unit according to Embodiment 1.

Now, an example of a process flow for the amount-of-blue-light accumulation unit 19 will be described using FIG. 3. FIG. 3 is a flowchart illustrating an example of the process flow for the amount-of-blue-light accumulation unit 19. The amount-of-blue-light accumulation unit 19, for example, starts the flowchart in FIG. 3 at a timing when the image display apparatus 1 is activated. The timing when the flowchart in FIG. 3 is started is not particularly limited. For example, the flowchart in FIG. 3 may be started at a timing when a predetermined operation mode is set for an operation mode for the image display apparatus 1. The amount-of-blue-light accumulation unit 19 constantly (or periodically) monitors the operation presence information during execution of the flowchart in FIG. 3.

First, the amount-of-blue-light accumulation unit 19 determines whether or not the user operation is being performed based on the operation presence in format ion from the operation time accumulation unit 15 (S101). In a case where the amount-of-blue-light accumulation unit 19 determines that the user operation is being performed, the process is advanced to S102. In a case where the amount-of-blue-light accumulation unit 19 determines that the user operation is not being performed, the process is returned to S101.

In S102, the amount-of-blue-light accumulation unit 19 adds the amount of blue light M output from the amount-of-blue-light calculation unit 18 to the total amount of light MT. An initial value of the total amount of light MT is 0. Thus, in a case where the user operation is started for the first time, the total amount of light MT is set to be the same value as that of the amount of blue light M. Then, based on the operation presence information from the operation time accumulation unit 15, the amount-of-blue-light accumulation unit 19 determines whether or not the user operation is being performed (S103). In a case where the amount-of-blue-light accumulation unit 19 determines that the user operation is being performed, the process is advanced to S104. In a case where the amount-of-blue-light accumulation unit 19 determines that the user operation is not being performed, the process is advanced to S106.

In S104, the amount-of-blue-light accumulation unit 19 determines whether or not the total amount of light MT has reached the threshold (third threshold). In a case where the amount-of-blue-light accumulation unit 19 determines that the total amount of light MT has reached the threshold, the process is advanced to S105. In a case where the amount-of-blue-light accumulation unit 19 determines that the total amount of light MT has not reached the threshold, the process is returned to S102. In S105, the amount-of-blue-light accumulation unit 19 outputs the total amount of light MT to the notification image generation unit 16. Subsequently, the process is returned to S101.

In S106, the amount-of-blue-light accumulation unit 19 reduces the value of the total amount of light MT. The amount-of-blue-light accumulation unit 19 then determines whether or not the user operation is being performed based on the operation presence information from the operation time accumulation unit 15 (S107). In a case where the amount-of-blue-light accumulation unit 19 determines that the user operation is not being performed, the process is advanced to S108. In a case where the amount-of-blue-light accumulation unit 19 determines that the user operation is being performed, the process is advanced to S102. In S108, the amount-of-blue-light accumulation unit 19 determines whether or not the total amount of light MT has been reduced to 0. In a case where the amount-of-blue-light accumulation unit 19 determines that the total amount of light MT has been reduced to 0, the process is returned to S101. In a case where the amount-of-blue-light accumulation unit. 19 determines that the total amount of light MT has not been reduced to 0, the process is returned to S106.

Figure 4:
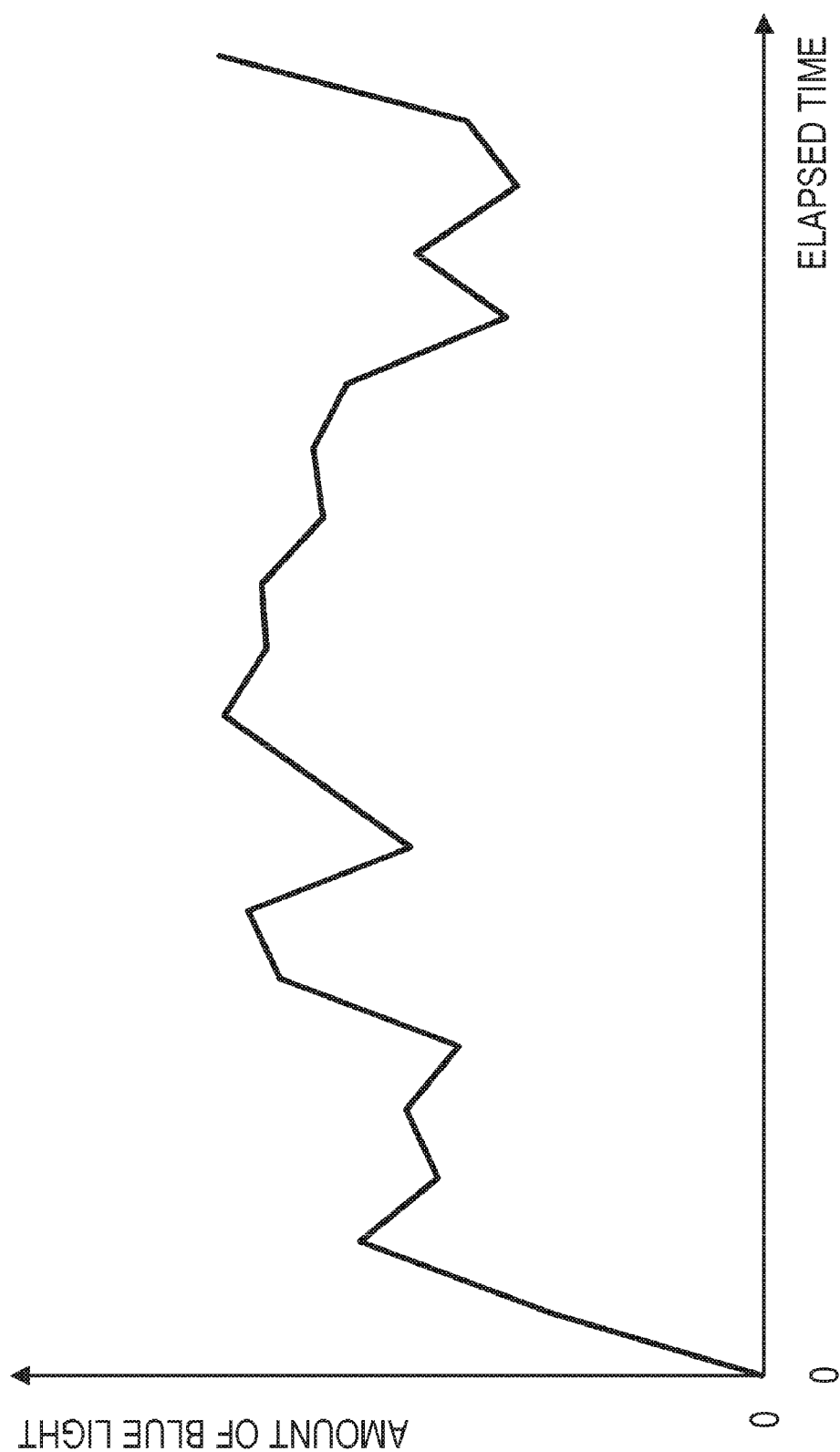
FIG. 4 is a diagram illustrating a temporal variation in the amount of blue light according to Embodiment 1.
Figure 5:
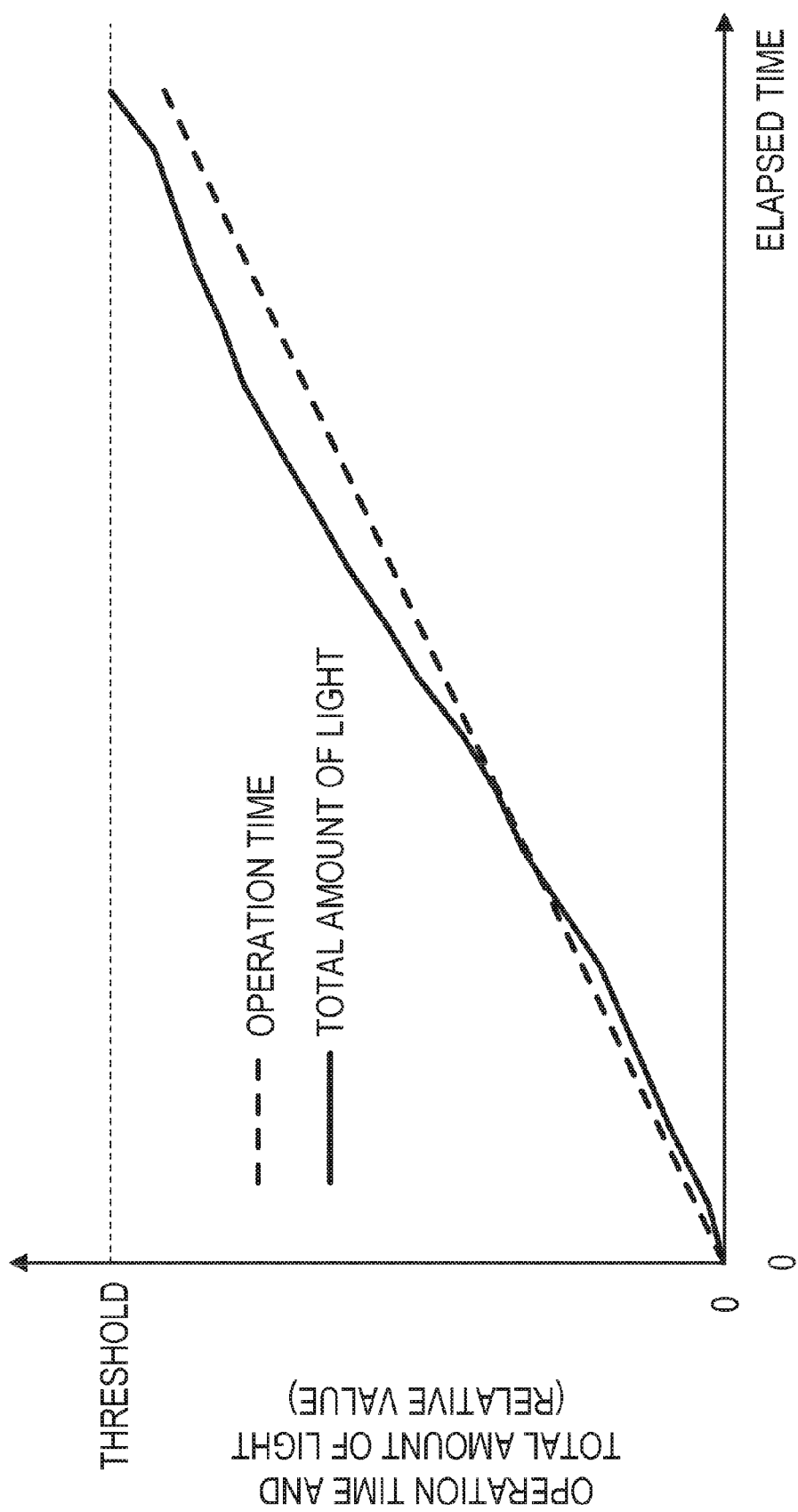
FIG. 5 is a diagram illustrating an example of an operation time and a temporal variation in the total amount of light according to Embodiment 1.

FIG. 4 illustrates an example of a temporal variation in the amount of blue light M. FIG. 5 illustrates an example of temporal variations in the value of the operation time relative to the first threshold and in the value of the total amount of light relative to the third threshold. FIGS. 4 and 5 illustrate temporal variations during the period when the user operation is performed. That is, FIGS. 4 and 5 illustrate temporal variations during the display period for the display target image.

As depicted in FIG. 5, the value of the operation time increases linearly over time. In a case where the input image data contains a still image, the value of the amount of blue light M does not temporally vary. Thus, in a case where the input image data contains still images, the value of the total amount of light MT increases linearly over time similarly to the value of the operation time. On the other hand, in a case where input image data contains moving images, the value of the amount of blue light M is calculated for every N frame (N is an integer of 1 or larger). For example, the average value Rn may be the average value of R values for the image data in a predetermined frame in the N frames or the average value of R values for the image data in the N frames. This also applies to the average values Gn and Bn. The predetermined frame is, for example, the first frame in the N frames. Then, the amount of blue light M during the period of the N frames is determined using such average values Rn, Gn, and Bn. Thus, in a case where the input image data contains moving images, the amount of blue light M varies (increases and decreases) irregularly over time as depicted in FIG. 4. As a result, in a case where the input image data contains moving images, the total amount of light MT increases irregularly over time as depicted in FIG. 5.

In the example in FIG. 5, the timing when the total amount of light MT reaches the third threshold is earlier than the timing when the operation time reaches the first threshold. This is because the user has continuously viewed images that emit much blue light. In the present embodiment, in such a case, predetermined notification (first notification) is performed in response to the total amount of light MT having reached the third threshold. As a result, health hazards caused by blue light can be effectively prevented.

Figure 6:
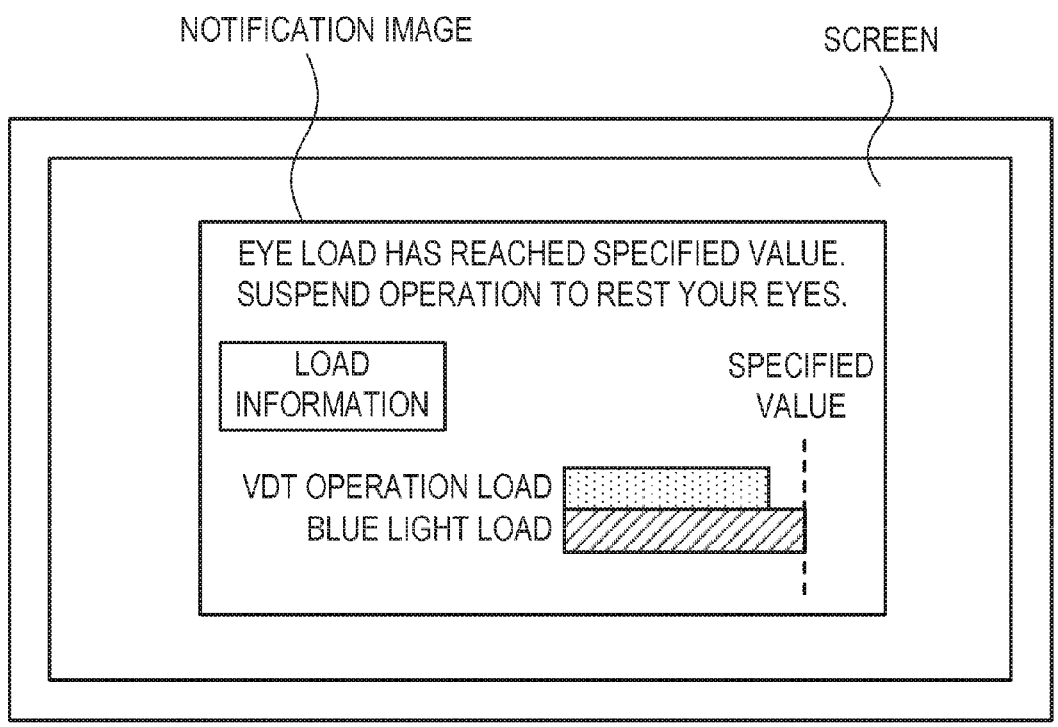
FIG. 6 is a diagram depicting an example of a notification image according to Embodiment 1.

FIG. 6 is a diagram depicting an example of a notification image provided if the timing when the total amount of light MT reaches the third threshold is earlier than the timing when the operation time reaches the first threshold. The notification image in FIG. 6 displays information indicative of the values of the operation time and the total amount of light MT relative to the thresholds (specified values). Specifically, in the notification image in FIG. 6, a scale indicating that the total amount of light MT has reached the third threshold is displayed (blue light load) and also a scale indicating the current operation time is displayed (VDT operation load). The notification image in FIG. 6 also displays a message prompting the user to take a rest. Display of the notification image in FIG. 6 allows the user to understand the current degree to which the user operation and viewing of blue light has affected the user's health.

In the present embodiment, the predetermined notification is performed in a case where the current total amount of light of a predetermined color emitted from the screen reaches the threshold, as described above. Thus, health hazards caused by the light of the predetermined color can be effectively prevented. In the present embodiment, the predetermined notification is also performed in a case where the time for which the user operation has been performed so far reaches the threshold. Consequently/health hazards caused by the light of the predetermined color can be effectively prevented.

In the present embodiment/the predetermined color is exemplified as being blue, but the predetermined color is not particularly limited. For example, yellow, purple, white, or the like may be used as the predetermined color.

The notification corresponding to the operation time need not necessarily be executed. Even if the notification corresponding to the operation time is not executed, health hazards caused by the light of the predetermined color can be effectively prevented.

A method for calculating the amount of blue light M is not particularly limited. For example, the average value of the R values in the input image data may be used as the average value Rn. The average value of the G values in the input image data may be used as the average value Gn. The average value of the B values in the input image data may be used as the average value Bn. This method can be suitably used in a case where the display target image is an image corresponding to the input image data. For example, the method is suitably used in a case where the image display apparatus does not have the image processing unit 12 or in a case where the image processing executed by the image processing unit 12 is omitted. Furthermore, "L/Lb" in Expression 1 may be omitted. The thus modified method can be suitably used, for example, in a case where the current brightness gain value is the reference brightness gain value and in a case where a fixed value (reference brightness gain value) is used as the brightness gain value.

Embodiment 2

An image display apparatus and a method for controlling the image display apparatus according to Embodiment 2 of the present invention will be described below. In Embodiment 1, the example has been described where the amount of blue light M is calculated using the reference spectral data representing the spectral characteristic resulting from the use of the reference brightness gain value Lb. In the present embodiment, an example will be described where the amount of blue light M is more accurately calculated using the current spectral data (reference spectral data) resulting from the use of the brightness gain value L. Configurations and processes in the present embodiment that are similar to corresponding configurations and processes in Embodiment 1 will not be described.

Figure 7:
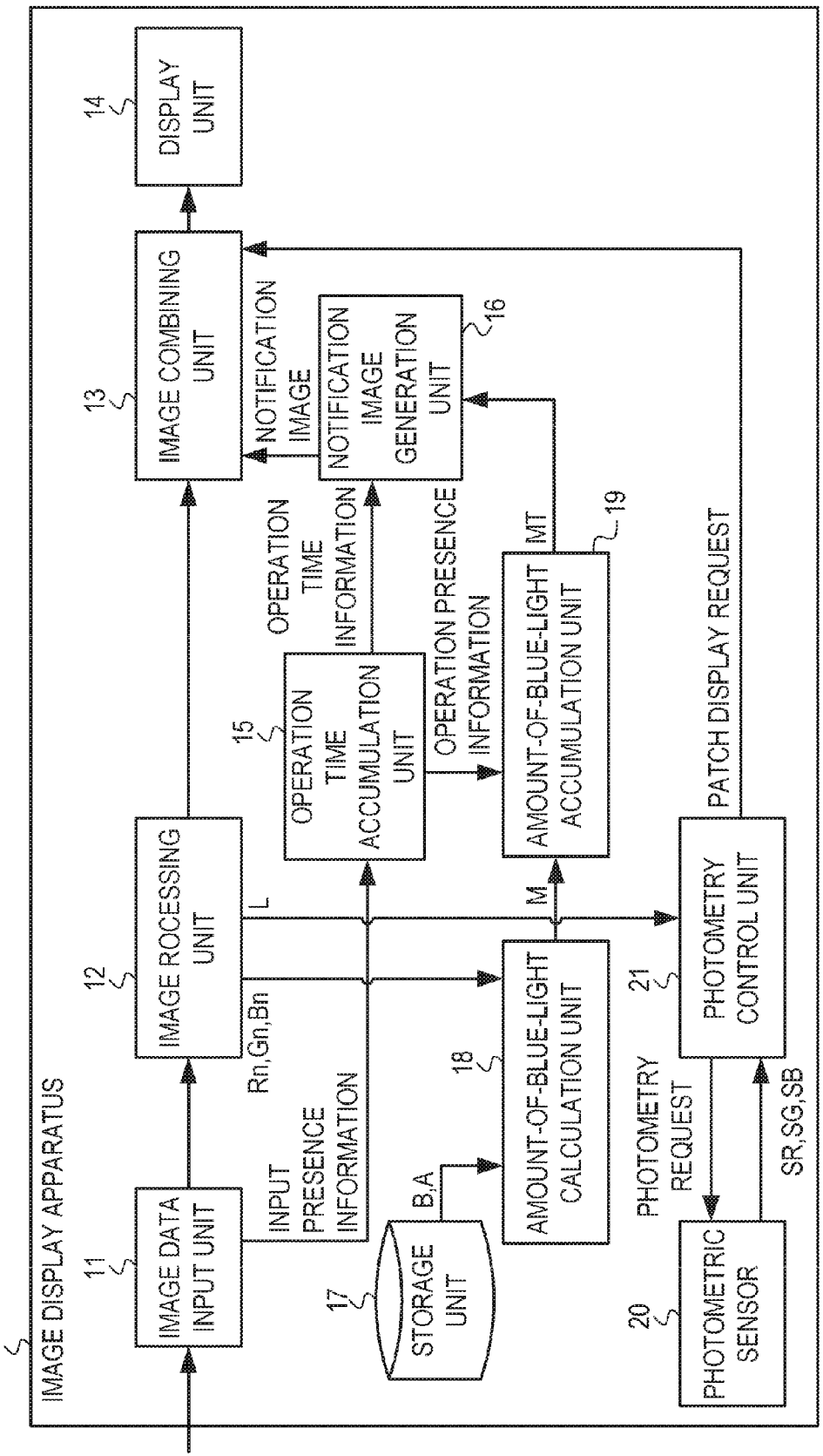
FIG. 7 is a block diagram depicting an example of a configuration of an image display apparatus according to Embodiment 2.

FIG. 7 is a block diagram depicting an example of a configuration of the image display apparatus 1 according to the present embodiment.

The image processing unit 12 generates processed image data in a manner similar to the manner in Embodiment 1, and outputs the resultant processed image data to the image combining unit 13. The image processing unit 12 then calculates the average values Rn, Gn, and Bn in a manner similar to the manner in Embodiment 1 and outputs the resultant average values Rn, Gn, and Bn to the amount-of-blue-light calculation unit 18. In the present embodiment, the image processing unit 12 outputs the brightness gain value L to a photometry control unit 21.

The image combining unit 13 executes a process similar to the corresponding process in Embodiment 1. In the present embodiment, in accordance with a patch display request from the photometry control unit 21, the image combining unit 13 generates photometric image data and combines the processed image data with the photometric image data into combined image data. The image combining unit 13 then outputs the resultant combined image data to the display unit 14. The combined image data with the processed image data combined with the photometric image data is photometric images superimposed on processed images. The photometric images are images represented by the photometric image data. The photometric images will be described below in detail. In the present embodiment, the image combining unit 13 outputs the processed image data to the display unit 14 in a case where no notification image data has been output from the notification image generation unit 16 and in a case where no patch display request has been output from the photometry control unit 21.

The storage unit 17 stores the blue-light hazard function $B(\lambda)$ and the display unit size $A[m^2]$.

The amount-of-blue-light calculation unit 18 executes a process similar to the corresponding process in Embodiment 1. However, in the present embodiment, the amount-of-blue-light calculation unit 18 calculates the amount of blue light M based on the processed image data (average values Rn, Gn, and Bn), the blue-light hazard function $B(\lambda)$, the display unit size A, and the reference spectral data SR $(\lambda)$, SG$(\lambda)$, SB$(\lambda)$, and SK$(\lambda)$. The average values Rn, Gn, and Bn are acquired from the image processing unit 12. The blue-light hazard function $B(\lambda)$ and the display unit size A are acquired from the storage unit 17. The reference spectral data SR$(\lambda)$, SG$(\lambda)$, SB$(\lambda)$, and SK$(\lambda)$ are acquired from the photometry control unit 21. A method for calculating the amount of blue light M will be described below in detail.

A photometric sensor 20 measures light emitted from the screen in accordance with a photometry request from the photometry control unit 21. The photometric sensor 20 then outputs measurement values (spectral data) of the light emitted from the screen, to the photometry control unit 21.

Figure 8:
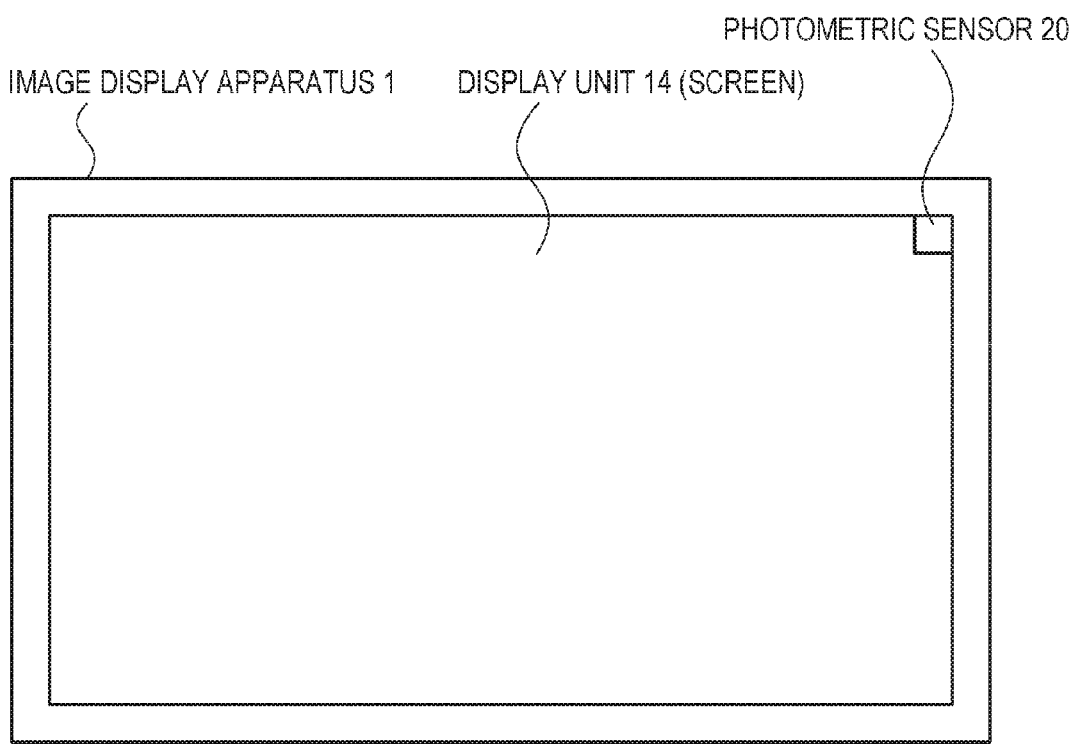
FIG. 8 is a diagram depicting an example of an installation position of a photometric sensor according to Embodiment 2.

The photometric sensor 20 is provided, for example, at an edge of the screen. In an example in FIG. 8, the photometric sensor 20 is provided in an upper right corner of the screen.

In the present embodiment, the photometric sensor 20 measures light emitted from a display area for a photometric image during the period when the photometric image is displayed. The photometric image is, for example, a patch image with an even color, an image including a plurality of patch images corresponding to a plurality of colors, or a graphic image containing a plurality of colors. The light emitted from the screen is measured for each of the plurality of colors to acquire measurement values that are a plurality of spectral data corresponding to the plurality of colors. In a case where one patch image is used as the photometric image, each of a plurality of photometric images is sequentially displayed to obtain a plurality of spectral data corresponding to the plurality of colors. In the present embodiment, with a patch image with a pixel value (255, 0, 0) displayed using the brightness gain value L, light emitted from a display area for the patch image is measured. Thus, reference spectral data SR(λ) is obtained. Similar measurement is performed on pixel values (0, 255, 0), (0, 0, 255), and (0, 0, 0) to obtain measurement values that are reference spectral data SG(λ), SB(λ), and SK(λ).

In the present embodiment, the reference spectral data SR(λ), SG(λ), SB(λ), and SK(λ) are obtained which are spectral data (measurement values) representing spectral characteristics obtained using the brightness gain value L instead of spectral characteristics obtained using the reference brightness gain value Lb. Furthermore, in the present embodiment, the reference spectral data SR(λ), SG(λ), SB(λ), and SK(λ) are obtained which are spectral data representing current spectral characteristics.

The photometric sensor 20 may be movably provided at a position where the photometric sensor 20 does not overlap the screen. For example, the photometric sensor 20 may be provided so as to be able to be housed in a bezel surrounding the screen. The position of the photometric sensor 20 may be manually or automatically changed. For example, the photometric sensor 20 may be automatically housed in the bezel during a period when photometry (measurement of light) is not performed. The photometric sensor 20 may be an apparatus separate from the image display apparatus 1.

In response to a variation in the brightness gain value L output from the image processing unit 12, the photometry control unit 21 outputs the patch display request to the image combining unit 13 and outputs a photometry request to the photometric sensor 20. The photometry control unit 21 then acquires measurement values (reference spectral data SR(λ), SG(λ), SB(λ), and SK(λ)) that have been output from the photometric sensor 20 and outputs the acquired measurement values to the amount-of-blue-light calculation unit 18. Thus, in the present embodiment, photometry is performed at a timing when the brightness gain value L varies. The timing to perform photometry is not particularly limited. For example, photometry may be performed in accordance with a user operation for requesting photometry.

Now, a method for calculating the amount of blue light M [W·sr$^{-1}$] according to the present embodiment will be described. First, the amount-of-blue-light calculation unit 18 calculates the spectral data S(λ) [W·m$^{-2}$·sr$^{-1}$·nm$^{-1}$] using Expression 3 illustrated below. Then, the amount-of-blue-light calculation unit 18 calculates the amount of blue light M [W·sr$^{-1}$] using Expression 2 described in Embodiment 1.

[Math. 3]

$$S(\lambda) = \frac{Rn}{255} \cdot (SR(\lambda) - SK(\lambda)) + \frac{Gn}{255} \cdot (SG(\lambda) - SK(\lambda)) + \frac{Bn}{255} \cdot (SB(\lambda) - SK(\lambda)) + SK(\lambda)$$

(Expression 3)

As described above, in the present embodiment, the amount of blue light M is calculated using reference spectral data that meets conditions 1 and 2 described below. Thus, the amount of blue light M can be more accurately calculated. Consequently, health hazards caused by blue light (light of the predetermined color) can be more effectively prevented.

Condition 1: The reference spectral data represents the spectral characteristic of light emitted from the screen in a case where image data for the color corresponding to the reference spectral data is displayed on the screen using the current set value of the parameter.

Condition 2: The reference spectral data represents the current spectral characteristic of light, emitted from the screen in a case where image data for the color corresponding to the reference spectral data is displayed on the screen.

One of Conditions 1 and 2, described above, need not be met. The amount of blue light M can be more accurately calculated as long as at least one of Conditions 1 and 2 is met. For example, the brightness gain value Lb may be set during display of the photometric image, and reference spectral data may be acquired which represents spectral characteristics obtained using the brightness gain value Lb. Such a method also allows reference spectral data representing the current spectral characteristic to be acquired. Specifically, reference spectral data can be acquired which represents a spectral characteristic in the current degradation state of the display unit 14. Furthermore, information (a function or a table) representing a corresponding relation between the brightness gain value and the reference spectral data may be prepared and used to acquire the reference spectral data corresponding to the brightness gain value L.

Embodiment 3

An image display apparatus and a method for controlling the image display apparatus according to Embodiment 3 of the present invention will be described. In Embodiments 1 and 2, examples has been described where the operation time and the total amount of light MT are obtained on the assumption that one user uses the image display apparatus. In the present embodiment, on the other hand, an example will be described where the operation time and the total amount of light MT are obtained on the assumption that a plurality of users use the image display apparatus. In the present embodiment, the operation time and the total amount of light MT are obtained, for example, on the assumption that a plurality of users simultaneously use the image display apparatus or that each of a plurality of users uses the image display apparatus in order. In the description below, configurations and processes similar to the corresponding configurations and processes in Embodiment 1 will not be described.

Figure 9:
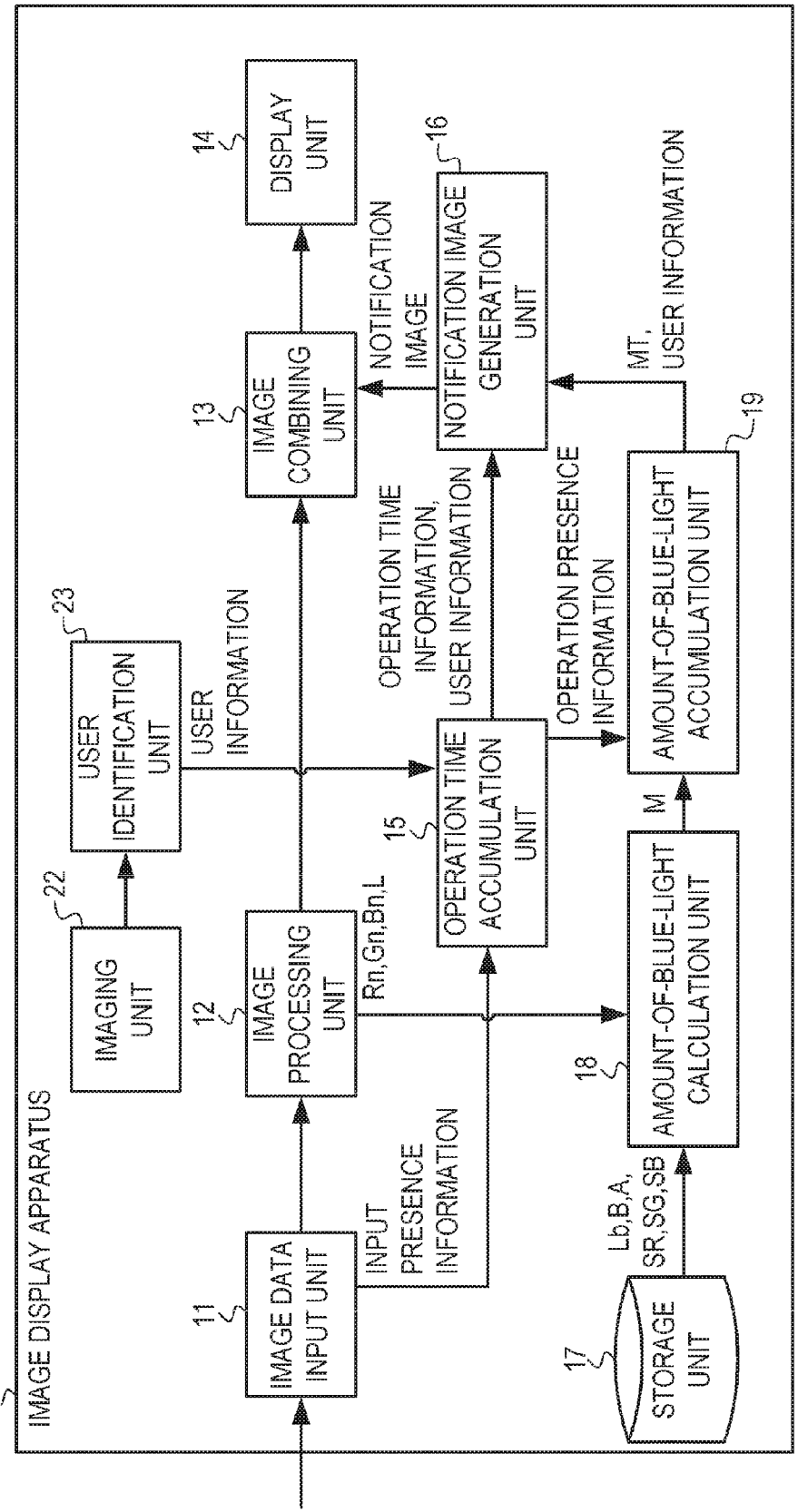
FIG. 9 is a block diagram depicting an example of a configuration of an image display apparatus according to Embodiment 3.

FIG. 9 is a block diagram depicting an example of a configuration of the image display apparatus 1 according to the present embodiment.

An imaging unit 22 takes an image of a front side of a screen to generate taken image data. The imaging unit 22 then outputs the resultant taken image data to a user identification unit 23. The imaging unit 22 is provided, for example, on an upper side of the screen. The position of the imaging unit 22 is not particularly limited. The imaging unit 22 may be an apparatus separate from the image display apparatus 1.

The user identification unit 23 identifies the current user of the image display apparatus 1. In the present embodiment, the user identification unit 23 analyzes the taken image data output from the imaging unit 22 to identify the person in front of the screen as the current user of the image display apparatus 1. The user identification unit 23 then outputs information on the identified user (user information) to the operation time accumulation unit 15. In the present embodiment, image data representing the user (user image data) is used as the user information. The user image data may be pre-registered image data or image data extracted from the taken image data. In a case where additional information such as the user's names is pre-registered, information including the user image data and the additional information is used as the user information.

A method for registering the user image data and the additional information is not particularly limited. For example, the user may operate the image display apparatus 1 to register various data and various pieces of information. Alternatively, an external apparatus (a PC, etc.) can be used to register various data and various pieces of information. Furthermore, a method for identifying the user is not particularly limited. For example, the current user of the image display apparatus 1 may be identified according to a user name (user ID) input to the image display apparatus 1 by the user.

The operation time accumulation unit 15 executes a process similar to the corresponding process in Embodiment 1. However, in the present embodiment, the operation time accumulation unit 15 calculates the operation time individually for each of the plurality of users. Then, in a case where the operation time of at least one user reaches the first threshold, the operation time accumulation unit 15 outputs at least the operation time information and user information on the user with the operation time having reached the first threshold, to the notification image generation unit 16. The operation time accumulation unit 15 also outputs the user information obtained from the user identification unit 23 to the amount-of-blue-light accumulation unit 19 in a case where outputting the operation presence information to the amount-of-blue-light accumulation unit 19.

The amount-of-blue-light accumulation unit 19 executes a process similar to the corresponding process in Embodiment 1. However, in the present embodiment, the amount-of-blue-light accumulation unit 19 individually calculates the total amount of light MT for each of the plurality of users. Then, in a case where the total amount of light MT for at least one user reaches the third threshold, the amount-of-blue-light accumulation unit 19 outputs, to the notification image generation unit 16, at least the total-amount-of-light information and user information on the user with the total amount of light MT having reached the third threshold.

The notification image generation unit 16 executes a process similar to the corresponding process in Embodiment 1. However, in the present embodiment, in a case where the operation time accumulation unit 15 outputs the operation time information and the user information, the notification image generation unit 16 acquires, from the amount-of-blue-light accumulation unit 19, information indicative of the total amount of light MT for the user with the operation time having reached the first threshold. In a case where the amount-of-blue-light accumulation unit 19 outputs the total-amount-of-light information and the user information, the notification image generation unit 16 acquires, from the operation time accumulation unit 15, information indicative of the current operation time of the user with the total amount of light MT having reached the third threshold. Then, based on the acquired information, the notification image generation unit 16 generates and outputs notification image data. Specifically, the notification image generation unit 16 generates notification image data representing the acquired user information, the current operation time of the user corresponding to the acquired user information, the current total amount of light MT for the user corresponding to the acquired user information, and a message prompting suspension of the user operation.

Figure 10:
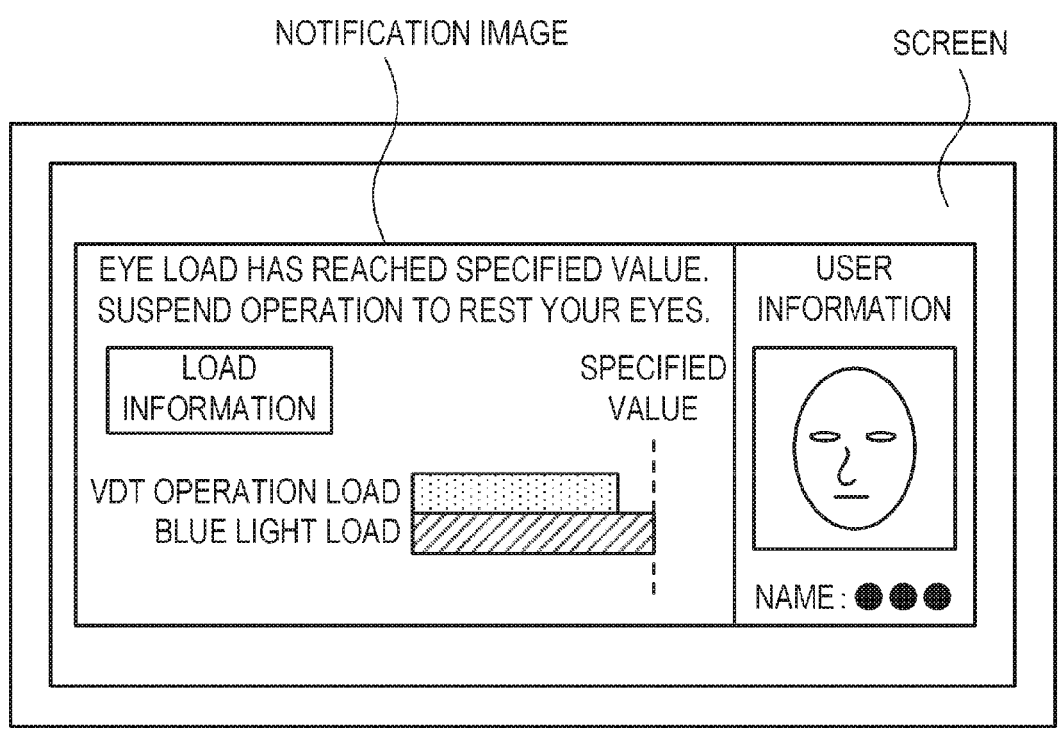
FIG. 10 is a diagram depicting an example of a notification image according to Embodiment 3.

FIG. 10 is a diagram illustrating an example of a notification image according to the present embodiment. FIG. 10 is a diagram illustrating an example of a notification image provided in a case where the timing when the total amount of light MT reaches the third threshold is earlier than the timing when the operation time reaches the first threshold. In the notification image in FIG. 10, as is the case with Embodiment 1, scales indicating the operation time and the total amount of light MT for the user with the total amount of light MT having reached the third threshold are displayed. The notification image in FIG. 10 also displays a message prompting the user to take a rest as is the case with Embodiment 1. The notification image in FIG. 10 further displays the user information on the user with the total amount of light MT having reached the third threshold. Consequently, the users can easily understand who needs to take a rest.

The information indicated by the notification image is not limited to the above-described information. For example, a notification image may be displayed which indicates various pieces of information on all the users identified by the user identification unit 23. A notification image may be displayed which indicates various pieces of information on a user for whom at least one of a difference between the operation time and the first threshold and a difference between the total amount of light MT and the third threshold is equal to or smaller than a fifth threshold. A notification image may be displayed which indicates various pieces of information on the user who has been identified by the user identification unit 23 and for whom the difference is equal to or smaller than the fifth threshold. Any notification image may be provided as long as suspension of the user operation can be prompted. The user information may be omitted from the notification image. A notification image may be displayed containing a message such as "**** (user name), please suspend operation".

In the present embodiment, the total amount of light is individually calculated for each of a plurality of users of the image display apparatus, as described above. Then, the predetermined notification is performed in a case where the total amount of light for at least one user reaches the threshold. This restrains the predetermined notification from being performed despite the total amount of light of the predetermined color viewed by the user being smaller than the threshold, thus allowing the notification to be performed at the appropriate timing for each user. As a result, health hazards to each user can be more effectively prevented. For example, in Embodiments 1 and 2, in a case where one user performs a user operation for a long time and then another user starts a user operation, the predetermined notification may be performed immediately after the start of the user operation by the latter user (inappropriate notification). In the present embodiment, such possible inappropriate notification can be suppressed. Furthermore, in the present embodiment, as the predetermined notification, the process is executed in which the screen displays information at least indicating the user with the total amount of light having reached the threshold. Consequently, the users can easily understand who needs to take a rest. The above-described process in the present embodiment is also applicable to Embodiment 2.

Embodiment 4

An image display apparatus and a method for controlling the image display apparatus according to Embodiment 4 of the present invention will be described. In Embodiments 1, 2, and 3, examples has been described where the notification image is presented to the user in a case where the load of blue light reaches the specified amount. In the present embodiment, an example will be described where the blue light in the image display apparatus is reduced or the user is prompted to reduce the blue light in a case where the load of the blue light reaches the specified amount. In the description below, configurations and processes similar to the corresponding configurations and processes in Embodiment 1 will not be described.

Figure 11:
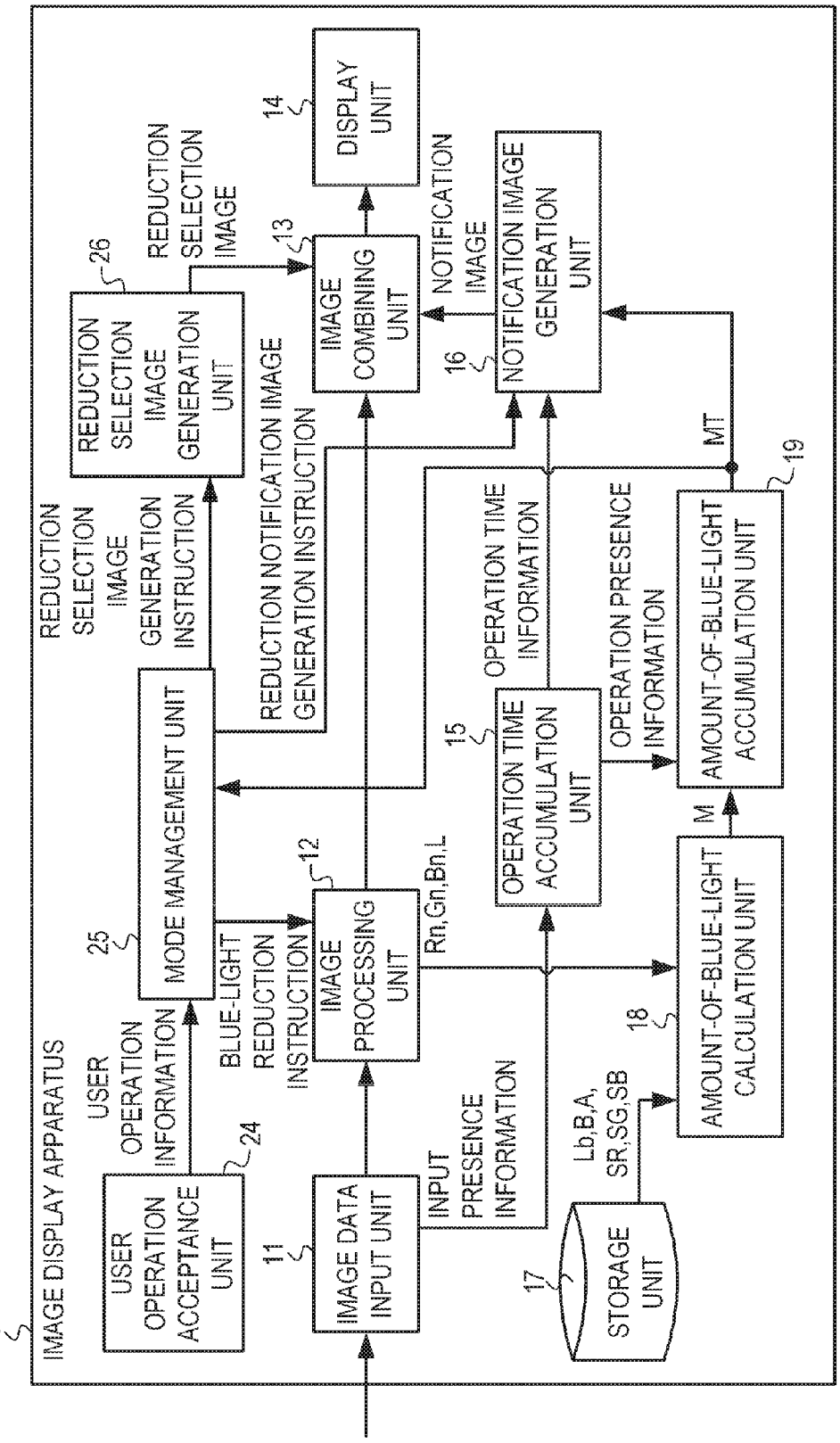
FIG. 11 is a block diagram depicting an example of a configuration of an image display apparatus according to Embodiment A.

FIG. 11 is a block diagram depicting an example of a configuration of the image display apparatus 1 according to the present embodiment.

A user operation acceptance unit 24 accepts a user operation such as depression of a button installed on the main body of the image display apparatus 1. The user operation acceptance unit 24 then outputs user operation information corresponding to the performed user operation to a mode management unit 25. The user operation is not limited to the button depression but may be a user operation using an infrared remote controller, a touch panel, or the like.

The mode management unit 25 manages a blue-light reduction mode. The number of types of the blue-light reduction mode is not particularly limited, but the present embodiment uses three types of modes, "automatic reduction", "manual reduction", and "no reduction". The mode management unit 25 selects and sets one of these three modes in accordance with the user operation information output from the user operation acceptance unit 24 (for example, user operation information corresponding to the user operation designating the blue-light reduction mode).

The "automatic reduction" is a mode in which the blue light (amount of blue light M) is reduced in a case where the total amount of blue light MT reaches the threshold. In the "automatic reduction", upon receiving the total-amount-of-light information from the amount-of-blue-light accumulation unit 19, the mode management unit 25 outputs a blue-light reduction instruction to reduce the amount of blue light M to the image processing unit 12. The mode management unit 25 also outputs, to the notification image generation unit 16, a reduction notification image generation instruction that allows the user to be notified that the amount of blue light M has been reduced.

The "manual reduction" is a mode in which the user is allowed to selectively determine whether or not to reduce the amount of blue light M in a case where the total amount of blue light MT reaches the threshold. In the "manual reduction", upon receiving the total-amount-of-light information from the amount-of-blue-light accumulation unit 19, the mode management unit 25 outputs, to a reduction selection image generation unit 26, a reduction selection image generation instruction that allows the user to selectively determine whether or not to reduce the amount of blue light M. Then, in a case where the user selectively determines to reduce the amount of blue light M, the mode management unit 25 outputs the blue-light reduction instruction to the image processing unit 12 and outputs the reduction notification image generation instruction to the notification image generation unit 16.

The "no reduction" is a mode in which a reduction in the amount of blue light M is not carried out even when the total amount of blue light MT reaches the threshold. In the "no reduction", the image display apparatus 1 performs an operation similar the corresponding operation in Embodiment 1.

Upon receiving the blue-light reduction instruction from the mode management unit 25, the image processing unit 12 further executes image processing (blue-light reduction process) for reducing the blue color in order to generate processed image data. For example, as a blue reduction process, image processing is executed in which a blue reduction filter (a coefficient by which the R value is multiplied, a coefficient by which the G value is multiplied, a coefficient by which the B value is multiplied)=(1.0, 1.0, 0.3) is applied to each pixel value. In a case where the blue reduction filter (1.0, 1.0, 0.3) is used, the pixel value (R value, G value, B value)=(200, 200, 200) is converted into a pixel value (200, 200, 60). Such image processing enables a reduction in the amount of blue light M.

The execution order of the predetermined image processing described in Embodiment 1 and image processing for a reduction in blue is not particularly limited. The blue reduction process may be executed by a functional unit different from the image processing unit 12. The values of the coefficients of the blue reduction filter are not limited to the above-described values. A method for reducing the amount of blue light M is not limited to the above-described method. For example, in an image display apparatus that displays images by modulating light from a light-emitting unit (a backlight or the like), the amount of blue light M can be reduced by changing the luminescent color of the light-emitting unit. Specifically, the amount of blue light M can be reduced by decreasing blue components of light from the light-emitting unit. In a case where the light-emitting unit has a blue light source (a light source that emits blue light), the amount of blue light M can be reduced by decreasing emission brightness of the blue light source.

In a case where the blue-light reduction mode "manual reduction" has been set and the total amount of light MT reaches the threshold (third threshold), the mode management unit 25 inputs the reduction selection image generation instruction to the reduction selection image generation unit 26. Then, in accordance with input of the reduction selection image generation instruction, the reduction selection image generation unit 26 generates selection image data representing a reduction selection image that allows the user to selectively determine whether or not to reduce the amount of blue light M, and outputs the selection image data to the image combining unit 13.

Figure 12:
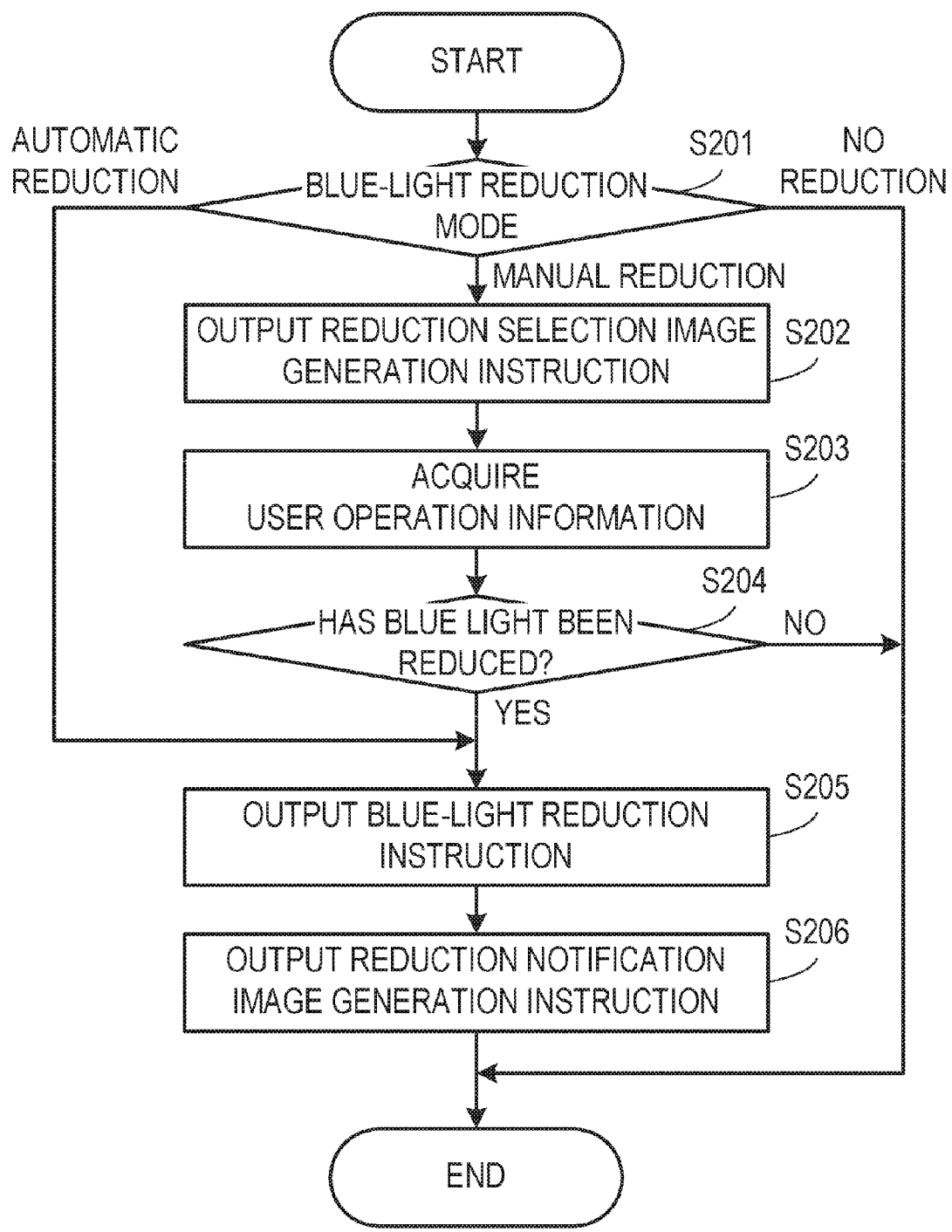
FIG. 12 is a flowchart illustrating an example of a process flow for a mode management unit, according to Embodiment 4.

Now, an example of a process flow for the mode management unit 25 will be described using FIG. 12. FIG. 12 is a flowchart illustrating the example of the process flow for the mode management unit 25. The mode management unit 25 starts the flowchart in FIG. 12 at a timing when the total-amount-of-light information from the amount-of-blue-light accumulation unit 19 is input to the mode management unit 25.

First, the mode management unit 25 determines a currently set blue-light reduction mode (S201). In a case where the "automatic reduction" has been set, the process is advanced to S205 in order to reduce the amount of blue light M. In a case where the "manual reduction" has been set, the process is advanced to S202 in order to allow; the user to selectively determine whether or not to reduce the amount of blue light M. In a case where the "no reduction" has been set, the mode management unit 25 determines a reduction in the amount of blue light M to be unwanted and ends the present flowchart.

In S202, the mode management unit 25 outputs the reduction selection image generation instruction to the reduction selection image generation unit 26 and advances the process to S203. In S203, the mode management unit 25 acquires the user operation information from the user operation acceptance unit 24 and advances the process to S204. In S204, the mode management unit 25 determines, based on the user operation information, whether or not the user has selectively determined to reduce the amount of blue light M. In a case where the user has selectively determined to reduce the amount of blue light M, the process is advanced to S205. In a case where the user has selectively determined not to reduce the amount of blue light M, the present flowchart is ended. In S205, the mode management unit 25 outputs the blue-light reduction instruction to the image processing unit 12 in order to reduce the amount of blue light M. The mode management unit 25 advances the process to S206. In S206, the mode management unit 25 outputs the reduction notification image generation instruction to the notification image generation unit 16 to end the present flowchart.

Figure 13:
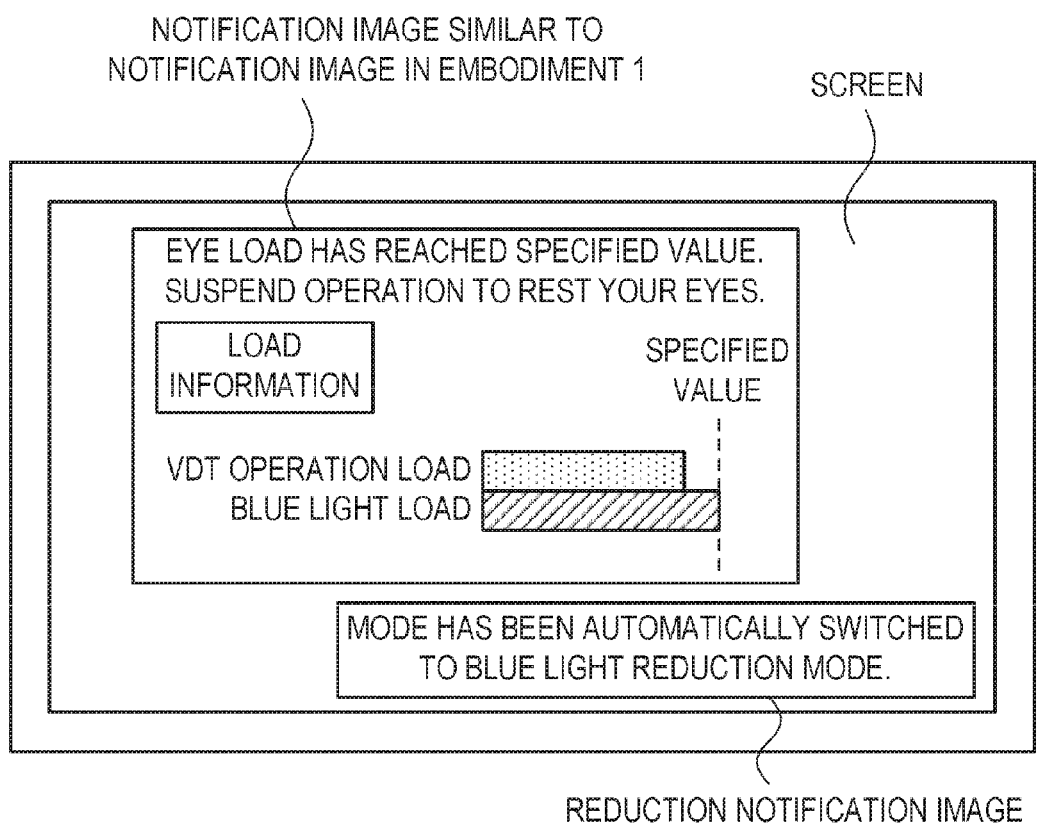
FIG. 13 is a diagram depicting an example of a notification image according to Embodiment 4.

FIG. 13 is a diagram illustrating an example of a notification image provided in a case where the blue-light reduction mode "automatic reduction" has been set and the total amount of light MT reaches the threshold (third threshold). In the notification image in FIG. 13, as is the case with Embodiment 1, scales indicating the operation time of and the total amount of light MT for the user with the total amount of light MT having reached the third threshold are displayed. The notification image in FIG. 13 also displays a message prompting the user to take a rest as is the case with Embodiment 1. The notification image in FIG. 13 further displays a message (reduction notification image) indicating that the amount of blue light M has been automatically reduced in order to decrease the load on the user. Consequently, the user can understand that the amount of blue light M has been reduced. The reduction notification image is generated by the notification image generation unit 16 in accordance with the reduction notification image generation instruction.

The above-described method is not the only method for notifying the user whether or not the amount of blue light M in the image display apparatus has been reduced. For example, instead of the message, a blue-light reduction notification mark may be displayed. Alternatively, the color of, for example, a power supply lamp on the main body of the image display apparatus may be changed to notify the user whether or not the amount of blue light M has been reduced. Alternatively, the image display apparatus may be interlocked with a sound output apparatus such that the user is notified by a sound from the sound output apparatus whether or not the amount of blue light M has been reduced. A method for notifying the user of the information is not particularly limited.

Figure 14:
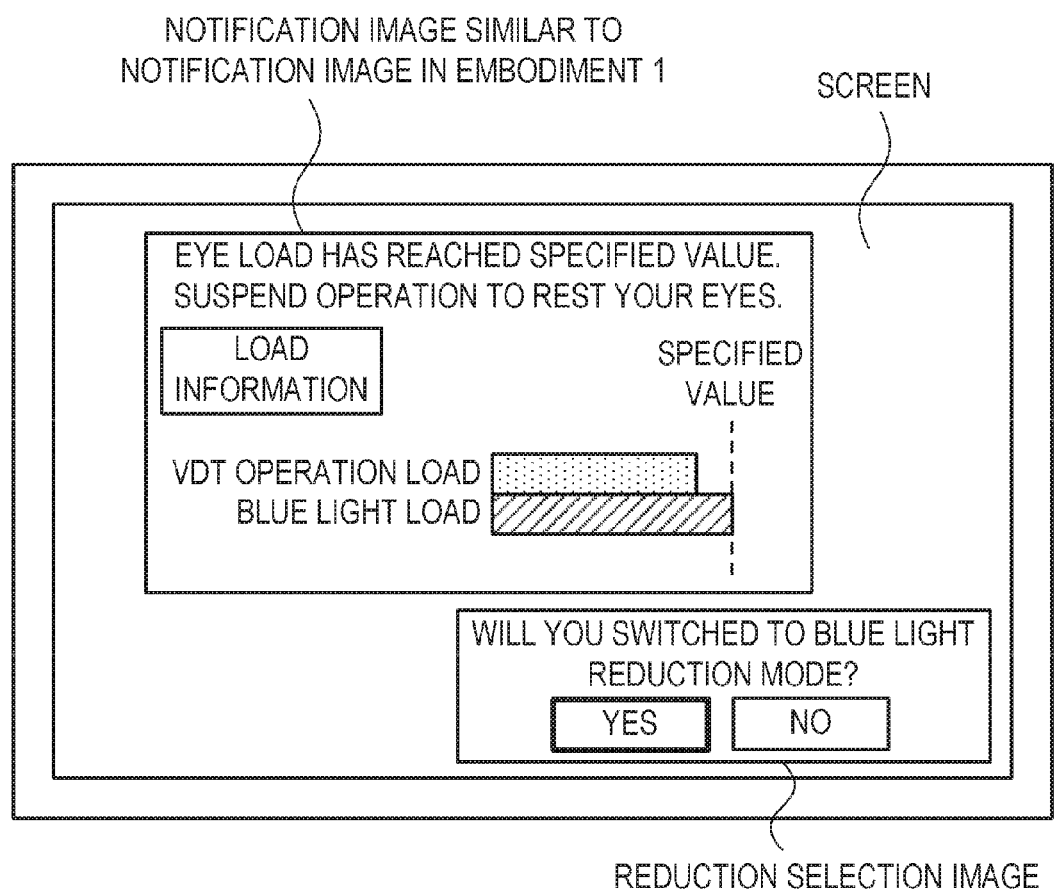
FIG. 14 is a diagram depicting an example of a notification image and a reduction selection image according to Embodiment 4.

FIG. 14 is a diagram depicting an example of the notification image and reduction selection image provided in a case where the blue-light reduction mode "manual reduction" has been set and the total amount of light MT reaches the threshold (third threshold). In the notification image in FIG. 14, as is the case with the Embodiment 1, scales indicating the operation time of and the total amount of light MT for the user with the total amount of light MT having reached the third threshold are displayed. The notification image in FIG. 14 also displays a message prompting the laser to take a rest as is the case with Embodiment 1. Moreover, in the example in FIG. 14, a menu image (reduction select ion image) is displayed which allows the user to selectively determine whether or not to reduce the amount of blue light M. This allows the user to selectively determine whether or not to reduce the amount of blue light M. In a case where the user selectively determines to reduce the amount of blue light M, a notification image similar to the notification image in FIG. 13 is generated and displayed. The reduction selection image is generated by the reduction selection image generation unit 26 in accordance with the reduction selection image generation instruction and is combined by the image combining unit 13. As a result, the reduction selection image is displayed on the screen.

In the present embodiment, the blue-light reduction mode "automatic reduction" allows an automatic reduction in the blue light in the image display apparatus in a case where the load of the blue light reaches the specified amount, as described above. This enables a reduction in the load on the user's continuous operations. Furthermore, the blue-light reduction mode "manual reduction" mode allows prevention of an unintended variation in display colors (the colors in the screen) caused by an automatic reduction in blue light. The blue-light reduction mode "manual reduction" mode also enables an intended reduction in blue light. As a result, health hazards to the user can be effectively prevented, while possible hindrance of the user's operations can be prevented. In addition, in the present embodiment, the process is executed which involves displaying the information indicating that the blue light has been reduced, on the screen as the predetermined notification. Thus, the user can easily understand whether the blue light in the image display apparatus has been reduced. The above-described process in the present embodiment is applicable to Embodiments 2 and 3.

In Embodiments 1 to A, the example has been described in which the notification image is displayed on the screen based on the total amount of blue light MT. However, the present invention is not limited to this. The notification image may be displayed (predetermined notification) based on the amount of blue light M. For example, if much blue light is temporarily emitted from the screen, the user may suffer health hazards. Thus, second notification (display of the predetermined notification image) may be performed in a case where the amount of blue light M calculated by the amount-of-blue-light calculation unit 18 is not less than the second threshold amount of light. For example, an image with a message "Images contain much blue light. Be careful." (an image that urges the user to take precautions) may be displayed on the screen in a case where the amount of blue light M is not less than the second threshold amount of light. As described above, as the notification image, an image may be used which at least indicates that the amount of blue light M is not less than the second threshold amount of light. Alternatively, the second notification may be performed in a case where the amount of blue light M is not less than the second threshold amount of light, and the first notification may be performed in a case where the total amount of light MT reaches the first threshold amount of light. The second threshold amount of light may be a value that is pre-specified by the relevant manufacturer or that is changeable by the user or that is automatically set according to the usage environment of the image display apparatus. Like the first notification, the second notification may be performed using sound, light, a graphic image, or the like.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-082349, filed on Apr. 14, 2015, and Japanese Patent Application No. 2016-049323, filed on Mar. 14, 2016, which are hereby incorporated by reference herein in their entirety.

What is claimed is:

1. An image display apparatus comprising:
a display unit configured to display an image based on an input image data on a screen;
a processor; and
a memory storing a program which, when executed by the process, causes the image display apparatus to:
calculate, based on the input image data, an amount of blue light emitted from the screen in a case where the image based on the input image data is displayed on the screen; and
perform control, in which a notification image is displayed on the screen, based on the amount of blue light, wherein
the amount of blue light is calculated based on:
blue pixel values of the input image data; and
a size of the screen.

2. The image display apparatus according to claim 1, wherein the blue light is light with a wavelength which is not less than 360 nm and not more than 495 nm.

3. The image display apparatus according to claim 1, wherein
the program, when executed by the processor, further causes the image display apparatus to generate processed image data by performing predetermined image processing on the input image data,
the image based on the input image data is an image corresponding to the processed image data, and
the amount of blue light is calculated based on the processed image data instead of the input image data.

4. The mage display apparatus according to claim 1, wherein
the amount of blue light is calculated based on:
the input image data;
a predetermined function that represents a corresponding relation between the wavelength of light and a degree of an effect of light on a human body;
the size of the screen; and
a plurality of spectral data corresponding respectively to a plurality of colors including blue, and
each of the plurality of spectral data represents a spectral characteristic of the light emitted from the screen in a case where an image data of the color corresponding to the spectral data is displayed on the screen.

5. The image display apparatus according to claim 4, wherein
the display unit changes at least one of the color and brightness of the screen using a set parameter,
the amount of blue light is calculated based on the input image data, the predetermined function, the size of the screen, the plurality of spectral data, a current set value of the parameter and a reference value of the parameter, and
each of the plurality of spectral data represents the spectral characteristic of the light emitted from the screen in a case where the image data of the color corresponding to the spectral data is displayed on the screen using the reference value of the parameter.

6. The image display apparatus according to claim 4, wherein
the display unit changes at least one of the color and brightness of the screen using a set parameter, and
each of the plurality of spectral data represents the spectral characteristic of the light emitted from the screen in a case where the image data of the color corresponding to the spectral data is displayed on the screen using a current set value of the parameter.

7. The image display apparatus according to claim 4, wherein
the program, when executed by the processor, further causes the image display apparatus to acquire, for each of the plurality of colors, spectral data representing a current spectral characteristic of light emitted from the screen in a case where the image data of the color is displayed on the screen, and
the amount of blue light is calculated by using a plurality of the acquired spectral data.

8. The image display apparatus according to claim 1, wherein
the program, when executed by the processor, further causes the image display apparatus to calculate a current total amount of blue light emitted from the screen by accumulating amounts of blue light calculated during a display period for the image based on the input image data, and
a first notification image is displayed on the screen, in a case where the total amount of blue light reaches a threshold.

9. The image display apparatus according to claim 8, wherein the first notification image indicates at least that the total amount of blue light has reached the threshold.

10. The image display apparatus according to claim 8, wherein the program, when executed by the processor, further causes the image display apparatus to reduce gradually a value of the total amount of blue light during a non-display period for the image based on the input image data.

11. The image display apparatus according to claim 8, wherein the program, when executed by the processor, further causes the image display apparatus to reset a value of the total amount of blue light to zero in a case where the image based on the input image data is not displayed from end of the display period for the image based on the input image data until a threshold time elapses.

12. The image display apparatus according to claim 8, wherein the program, when executed by the processor, further causes the image display apparatus to reduce the amount of blue light in a case where the total amount of blue light reaches the threshold.

13. The mage display apparatus according to claim 12, wherein a second notification mage is displayed on the screen, in a case where the amount of blue light has been reduced.

14. The image display apparatus according to claim 12, wherein
the program, when executed by the processor, further causes the image display apparatus to allow a user to selectively determine whether or not to reduce the amount of blue light in a case where the total amount of blue light reaches the threshold, and
the amount of blue light is reduced in a case where the user selectively determines to reduce the amount of blue light.

15. The image display apparatus according to claim 1, wherein the notification image is displayed on the screen, in a case where the amount of blue light is not less than a threshold.

16. An image display apparatus comprising:
a display unit configured to display an image based on an input image data on a screen;
a processor; and
a memory storing a program which, when executed by the processor, causes the image display apparatus to:
identify a current user of the image display apparatus,
calculated a current total amount of blue light emitted from the screen by accumulating amounts of blue light emitted from the screen in a case where the image based on the input image data is displayed on the screen; and
perform control, in which a notification image is displayed on the screen, based on the total amount of blue light, wherein
the total amount of blue light is individually calculated for each of a plurality of users of the image display apparatus, and
the first notification is displayed on the screen, in a case where the total amount of blue light for at least one user reaches a threshold.

17. The image display apparatus according to claim 16, wherein the notification image indicates at least the user for whom the total amount of blue light having reached the threshold.

* * * * *